June 2, 1970   L. G. STRIGGOW   3,515,903

LOAD MONITOR MODULE

Filed June 8, 1966

INVENTOR.
LEWIS G. STRIGGOW
BY
Wilson, Settle, Batchelder
ATT'YS.   & Craig

June 2, 1970  L. G. STRIGGOW  3,515,903
LOAD MONITOR MODULE

Filed June 8, 1966  4 Sheets-Sheet 3

INVENTOR.
LEWIS G. STRIGGOW
BY
Wilson, Settle, Batchelder
Att'ys.  & Craig

June 2, 1970    L. G. STRIGGOW    3,515,903
LOAD MONITOR MODULE
Filed June 8, 1966    4 Sheets-Sheet 4

INVENTOR.
LEWIS G. STRIGGOW
BY
Wilson, Settle, Batchelder
ATTYS. & Craig

United States Patent Office 3,515,903
Patented June 2, 1970

3,515,903
LOAD MONITOR MODULE
Lewis G. Striggow, 1115 Marion Drive,
Holly, Mich. 48442
Filed June 8, 1966, Ser. No. 556,204
Int. Cl. H03k 17/00; G08b 19/00
U.S. Cl. 307—252                                    5 Claims

ABSTRACT OF THE DISCLOSURE

A circuit for monitoring a continuous industrial process by initiating an alarm at a predetermined threshold of a signal received from a transducer responsive to a process condition. The circuit includes a source of a full wave rectified signal, a terminal at zero potential, a silicon controlled rectifier, a diode, a load, and means connecting the source, the diode, the silicon controlled rectifier, the load and the zero terminal in a series circuit path for conducting current flowing from the source to the zero terminal when the siilcon controlled rectifier is fired. A second source supplying positive voltage is connected by a resistor and a diode to the gate of the silicon controlled rectifier, and a third resistor connects the gate of the silicon controlled rectifier to its cathode. A neon tube and a resistor are connected in series with each other and in parallel with the load for indicating the condition of conduction of the silicon controlled rectifier. Means is provided for applying a blocking signal between the first resistor and the second diode to prevent conduction of the silicon controlled rectifier when desired. A capacitor may also be provided for selectively sustaining conduction of the silicon controlled rectifier even when the firing signal is blocked.

---

This invention relates generally to control of continuous industrial processes. More particularly, this invention relates to apparatus using silicon control rectifiers to provide logical sequence of signals in monitoring the control of continuous industrial processes.

In the art of controlling and monitoring continuous industrial processes by electrical systems, it has been a common practice to resort to several alternatives, each having undesirable aspects. One alternative is to rely upon the slower responses, chattering, arcing, and contact corrosion of relays and manually operated switches in control circuitry. In another alternative, expensive components having low power ratings and requiring costly and special power supplies are used in networks controlling industrial processes. These components have resulted in inefficient operation of the control networks because of down time caused by frequent replacement in the case of wide spread use of vacuum tubes. On the other hand, where the components have been primarily solid state devices such as transistors, extremely narrow ranges of tolerance for variation in power supplied to these components have resulted in very elaborate and expensive power supplies and circuit breakers to protect them.

It is an object of this invention to provide a system for controlling and monitoring electrical overloads in transducers used in continuous industrial processes that has the rapid response and convenient logical function grouping of solid state networks, freedom from switch contact problems, is inexpensive to build and maintain, and that is powered directly by conventional industrial electrical lines.

It has been a practice in the past to designate logical functions of controlling apparatus by either representation of the circuit components involved, or by a font of symbols used to designate the logical function. Prior to this invention, no font of symbols has been utilized to designate logical functions in network controlling and monitoring industrial processes where the font of symbols indicates simultaneously logical function, wave shape characteristics, source of signal, and electrical connections. Accordingly, it is another object of this invention to provide apparatus for the control and monitoring of industrial processes corresponding to a font of symbols that reflect the logical functions, wave shape characteristics, sources of signal, and electrical interconnections of the apparatus.

In networks utlized in systems for the controlling and monitoring of continuous industrial processes, it has been a common practice not only to rely on different configurations and choice of components for the linear elements of such networks, but also to have such variation with regard to the non-linear components. In the present invention, it is an object to achieve economy and simplicity of design, and readily interchangeable logical functions by readily interchangeable modules, by reliance on basically one kind of network configuration for each of several logical functions in a system for controlling and monitoring continuous industrial processes that is powered directly by conventional industrial lines, wherein the change in the network from one logical function to another does not require a change of components having nonlinear characteristics.

It is another object of this invention to provide a system for controlling and monitoring continuous industrial processes comprising networks for performing logical functions therefor wherein such logical functions are dependent upon the actuation of a silicon control rectifier by the selective charging and discharging of capacitors in an RC configuration arranged selectively across two of the anode, gate and cathode electrodes of the silicon control rectifier.

Other objects of this invention will appear in the following description and appended claims, reference being had to the accompanying drawings forming a part of this specification.

ON THE DRAWINGS

Before explaining the present invention in detail, it is to be understood that the invention is not limited in its application to the details in construction and arrangement of parts illustrated in the accompanying drawings since the invention is capable of other embodiments and being practiced or carried out in various ways.

Also it is to be understood that the phraseology and terminology employed herein is for the purpose of description and not of limitation.

AS SHOWN ON THE DRAWINGS

Figure 1:
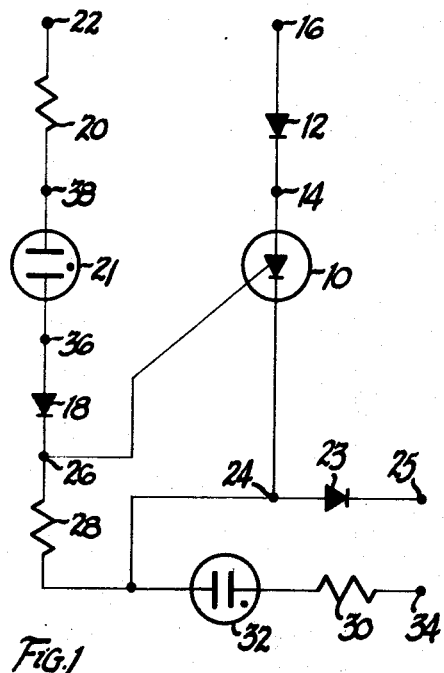
FIG. 1 is a schematic representation of a basic circuit utilizing the principles of the present invention in which an on-off gating function is provided.

In FIG. 1, there is shown in schematic form, a basic control circuit of the present invention utilizing a silicon control rectifier. The silicon control rectifier 10 is connected at its anode, or normally positive side, to the cathode, or normally negative side, of a rectifier 12 at a junction 14. Full wave rectified sinusoidal excitation is applied to the anode, or normally positive side, of the rectifier 12 at the node 16. The control junction of the silicon control rectifier 10 is connected to the cathode, or normally negative side, of a diode 18. The anode, or normally positive side of the diode 18, is connected to a node 36. Node 36 is connected to a neon or a resistance 21, the anode of which is connected to a node 38 which in turn is connected to a resistance 20. In the operation of the control circuit shown in FIG. 1, a positive signal is selectively applied at the node 22.

The node 38 between resistor 20 and neon 21 is a signal block node when a zero signal is applied preventing turn on. A resistor substituted for neon 21 allows lower potential signals to perform the same function without the neon avalanche.

The cathode, or normally negative side, of the silicon control recifier 10 is referred to as the output side of the silicon control rectifier at the node 24. A diode 23 has its anode connected to the node 24. Intermediate the node 26, which corresponds to the control junction or gate of the silicon control rectifier, and the output node 24, is a connecting resistance 28 to calibrate the sensitivity of avalanching of the silicon control rectifier. Also connected to the output node 24, is another resistance 30. The resistance 30 is in series with a bulb, preferably a neon tube, designated at numeral 32. The relatively low voltage side of the bulb 32 is connected through resistor 30 to the node of lowest potential 34 in the circuit. This is preferably clamped at zero potential.

The circuit immediately described above is referred to below as the network associated with the silicon control rectifier 121 in the basic plug-in module. It can be appreciated that when a rectified signal is applied at the node 16, because of the characteristics of the silicon control rectifier, no positive signal is observed at the node 24. However, when a sufficiently large positive signal is applied to the control junction of the silicon control rectifier, namely at the node 26, the silicon control rectifier 10 is operable to transmit a positive signal to node 24 at its cathode. The node 34 being normally clamped at a lower potential than node 24 when the silicon control rectifier 55 is in a conducting condition, causes current to pass through the circuit branch containing the series combination of the resistance 30 and the bulb 32. This results in the burning of the bulb 32, giving a visual indication of a conduction state or "on" condition of the silicon control rectifier. A neon tube 21 is shown in series with resistor 20. It provides a minimum threshold of potential for a positive signal applied at the node 22 to fire the silicon control rectifier.

It can be appreciated from the foregoing description of the circuit represented in FIG. 1 that after a positive signal no longer is applied at the node 22, the silicon control rectifier will cease to conduct as soon as the rectified sinusoidal signal applied at the node 16 is reduced close to zero during the half cycle.

It can be appreciated that if a signal is applied at the node 36, at the anode or positive side of the diode 18, and this signal effectively clamps the potential at the node 36 to zero, that regardless of a positive signal being applied at the node 22, the potential at the gate of the silicon control rectifier (node 26) will not rise sufficiently to allow the silicon control rectifier 10 to conduct. This signal is referred to as a zero potential signal blocking a positive gating signal. The node 38 between resistor 20 and neon 21 allows signal block by a signal that is not perfect zero. Subsequently, the higher voltage available at node 38 over the node 36 may be zeroed through another SCR which has to have a higher potentail at the anode to latch into conduction to provide the zero signal or to use a positive volt zero block of the zeroing circuit of the turn on signal in an "and" type configuration.

Figure 2:
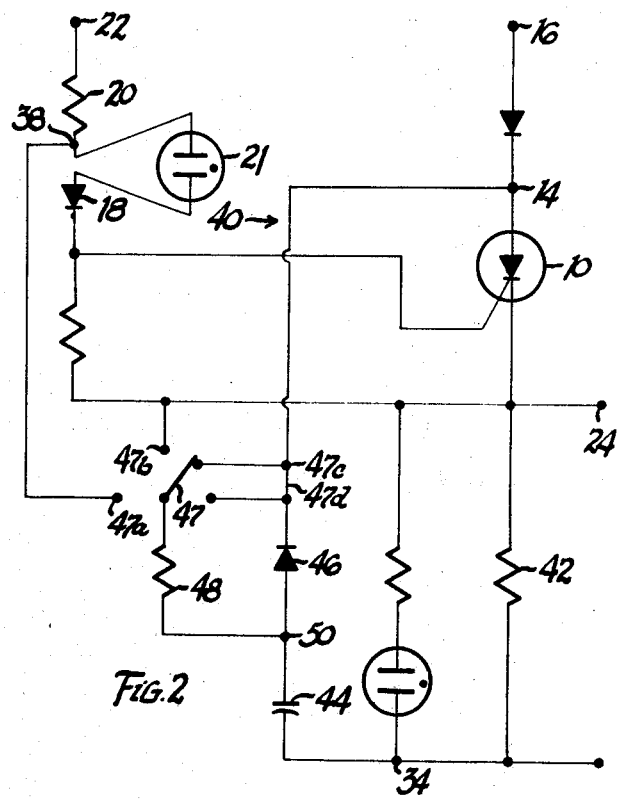
FIGS. 2 and 3 are schematic representations of networks embodying the principles of the present invention in which a logical function is determined by the charging and discharging of a capacitor across the electrodes of a silicon control rectifier.

The circuit shown in FIG. 2 is similar to the one shown in FIG. 1, except that the diode 23 is not present, and an additional branch, referred to generally at numeral 40, has been connected to the nodes 14 and 34, and a resistance 42 has been placed across the series combination of the resistor 30 and the tube 32, being connected to the nodes 24 and 34.

The circuit branch 40 comprises a capacitor 44 connected in series with a diode 46. A resistor 48 is in parallel with the diode 46. The diode 46 is connected at its cathode, or current output side, to the node 14 at the anode side of the silicon control rectifier. The anode side of the diode 46 is connected to the capacitor 44 at the node 50. The capacitor 44 is connected to the node 34.

When a positive signal is applied to the node 22, the silicon control rectifier 10 is rendered operable, the excitation, of a full wave rectified excitation being applied at the node 16, resulting in a positive response at the node 24. Sufficient energy is applied to the capacitor 44 to charge it before the silicon control rectifier conducts. In the particular circuit shown in FIG. 2, the capacitor is connected so as to both charge and discharge to the anode of the silicon control rectifier 10. By being connected for charge and discharge to the cathode or gate of the silicon control rectifier, different logical functions can be obtained. The resistance 48 is relatively large, which slows the rate of charging of the capacitor. The time constant of the RC combination of the resistance 48 and the capacitor 44 is such that discharge current from the capacitor is passed through the diode 46 when the sinusoidal signal at node 16 is past 90°. By judicious selection of the time constant of the RC combination of the capacitor 44 and the resistance 48, the silicon control rectifier can be made to continue in its conduction state after the removal of the positive signal at the node 22. This operation of this circuit results in a "lock on" condition once a positive signal is applied at the node 22, regardless of whether it is removed thereafter. A result of this "lock on" condition is that a positive signal is observed at the node 24.

It can be appreciated that if a signal is applied at node 50 so as to hold the potential at that node clamped to zero, that capacitor 44 cannot charge. A result of the application of this zero clamping signal at node 50 is that once a positive signal is removed from application to node 22, the "lock on" feature immediately described above is negated. However, if a positive signal is subsequently applied at node 22, the silicon control rectifier can turn on as a slave to the positive signal.

Figure 3:
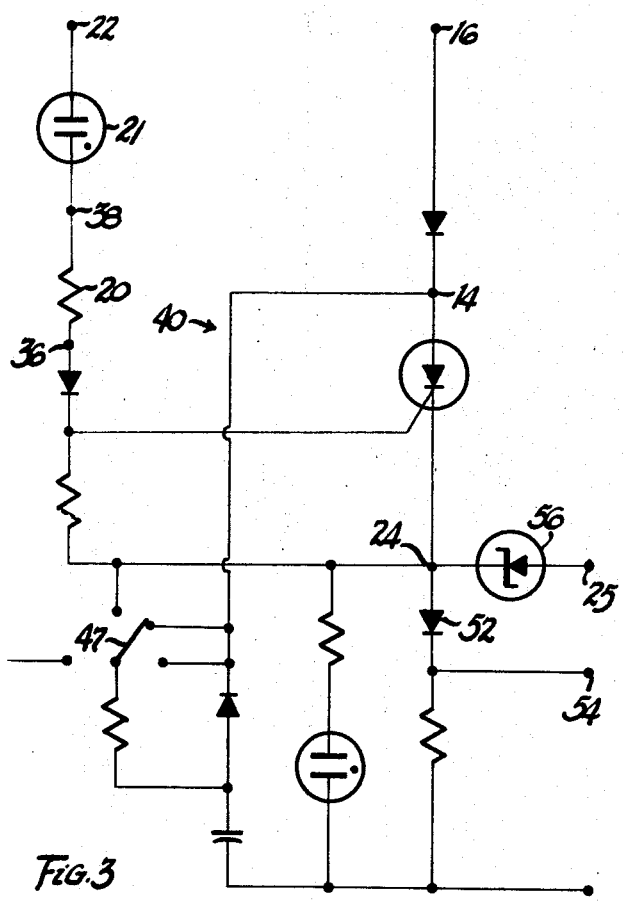

FIG. 3 shows, in schematic form, a circuit similar to that shown in FIG. 2 except that a diode 52 is inserted between the terminal 24 at the cathode of the silicon control rectifier and the terminal 54 of the resistance 42. More specifically, the anode or positive side of the diode 52 is connected to the terminal 24, and the cathode or negative side of the diode 52 is connected to the terminal 54.

In addition to the immediately aforementioned modification by the addition of the diode 52, a Zener diode 56 is intermediate the terminal 24 and the terminal 25. The Zener diode 56, before breakdown, prevents excitation applied at the terminal 22 from reaching the terminal 25. A neon tube can be used in place of the Zener diode. Basically, the purpose of this Zener diode is to prevent the impression of a positive signal at the cathode of the silicon control rectifier being applied to a succeeding module that the circuit represented in FIG. 3 feeds. The Zener or neon prevents the signal from zeroing except through 52 (FIG. 3) unless the signal exceeds the Zener or neon avalanche.

It can be appreciated that if a positive signal is applied at the terminal 54, a positive signal applied at the terminal 22 is blocked.

The results of the application of a positive signal at the terminal 54 in the circuit represented by FIG. 3 is similar to a zero signal being applied to the terminal 36 in the circuit represented by FIG. 1. In both cases, a positive signal applied to the terminal 22 does not render the silicon control rectifier into a conductive state because of the overriding function of another signal applied to the circuit. This other signal, whether it be a zero signal in the case of the circuit represented in FIG. 1, or a positive signal applied to the circuit represented in FIG. 3, blocks the positive signal applied to the terminal 22 from rendering the silicon control rectifier into a conductive state.

Figure 4:
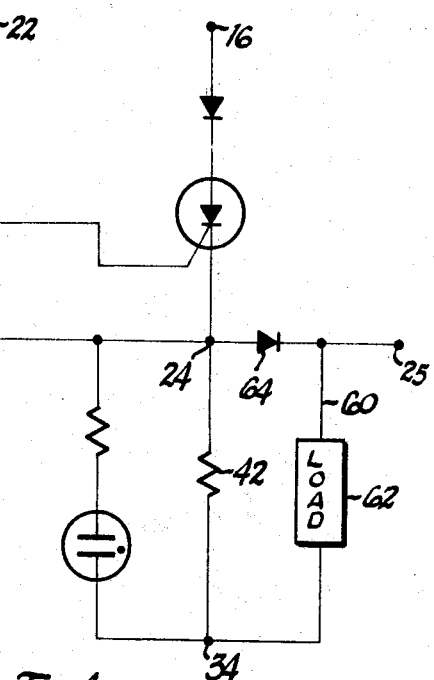
FIG. 4 is a schematic representation of a network embodying the principles of the present invention in which a logical function is applied to a load connected to the cathode of a silicon control rectifier.

The schematic representation of a circuit shown in FIG. 4 is that of a network similar to the network represented in FIG. 3, except that the circuit branch 40 is removed and a different circuit branch 60 is applied to the cathode of the silicon control rectifier. The circuit branch 60 comprises a load 62 that can be regarded as an impedance with a reactive component that can be neglected.

A diode 64 is connected between the terminal 25 and the terminal 24. Its anode, or normally positive side, is connected to the terminal 24, and its cathode, or normally negative side, is connected to the terminal 25. If the circuit branch 60 is removed or open circuited, this is equivalent to a circuit shown in FIG. 1 and is referred to as a nromally open unconnected load circuit. There is an internal path to zero through resistor 42.

In the cases of the normally open and normally closed circuits, an internal path to zero circuit eliminates the necessity for the load to provide a zero potential. The necessity of a clamped low potential somewhere in the circuit is necessary in order for a relatively positive signal to be applied at the control terminal of the silicon control rectifier compared with the potential observed at the cathode of the silicon control rectifier.

LOGICAL GROUPING SYSTEM NETWORK

Figure 5:
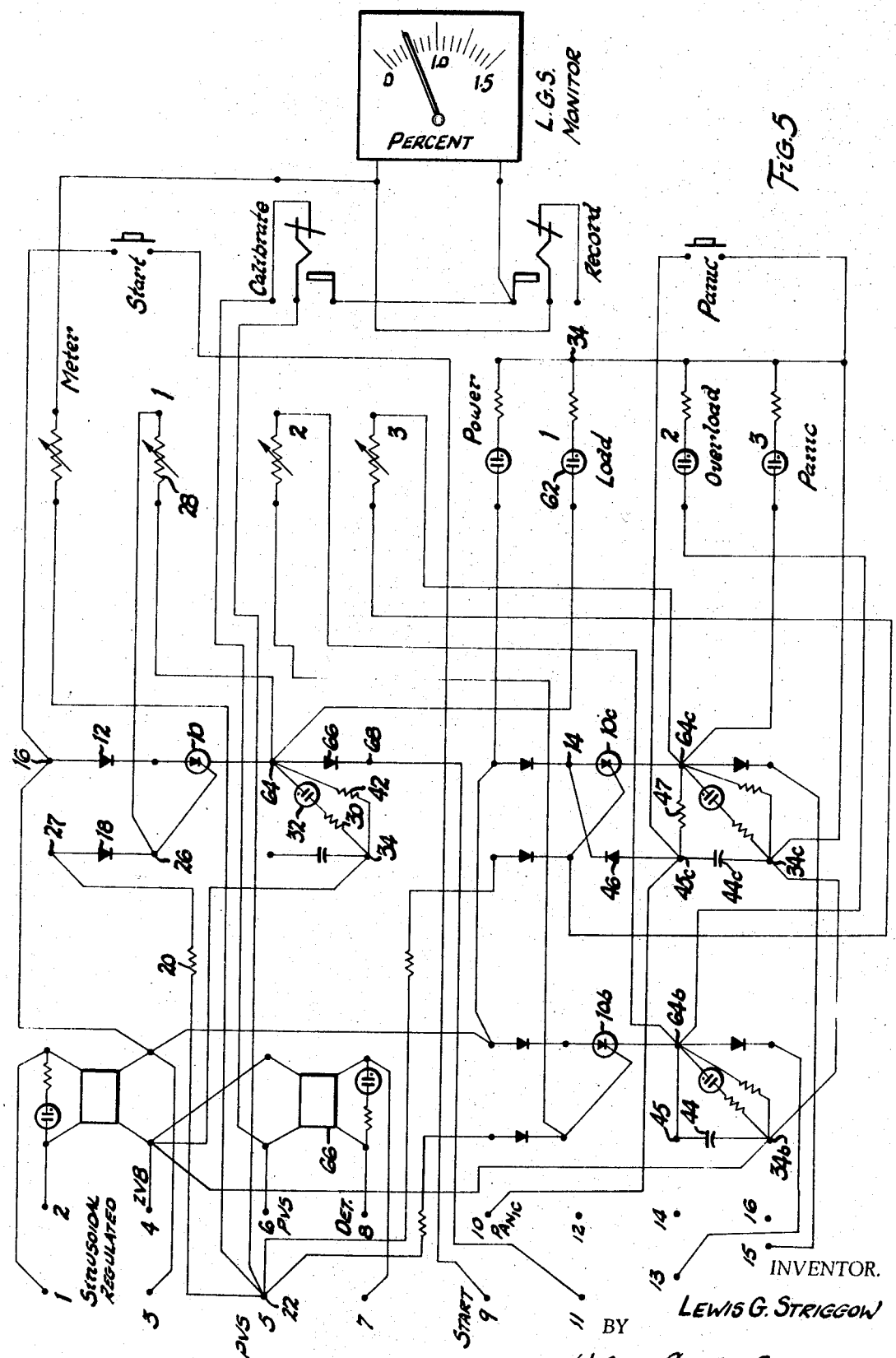
FIG. 5 is a schematic representation of a network involving several different logical functions used to monitor and control a continuous industrial process embodying the principles of the present invention.

Referring to FIG. 5 there is shown the preferred embodiment, in schematic form, of a network utilizing the principles of the present invention. Referring to this network as a logical grouping system, there is shown a full wave rectified sinusoidal excitation applied to a terminal or node designated numeral 16.

Attached directly to the node 16 is a rectifier 12. The rectifier 12 is preferably a solid state diode. The cathode of rectifier 12 is connected to the anode of a silicon control rectifier 10.

The control or gate junction of the silicon control rectifier, designated numeral 26, is connected to the cathode of a diode 18. The diode 18 is preferably a solid state rectifier. The anode of the diode 18 is connected at a node 27 to a resistance 20. The resistance 20 is connected at a node 22 to a signal supplied from a transducer not shown in this diagram. In order for the present circuit to be operable in an "on" condition, it is necessary that the signal supplied at the node 22 be nonzero and positive.

Connected across the gate and cathode of the silicon control rectifier 10, is a variable resistor 28.

The cathode of the silicon control rectifier 10 is connected at node 64 to an indicating device. The indicating device is preferably a neon tube in series with a balancing resistor. This series combination is connected to a zero potential clamp at a node 34.

Also connected to the cathode of the silicon control rectifier 10 is a diode 66. The diode 66 is preferably a solid state rectifier, and is operable to conduct current away from the node 64. The cathode of the diode 66 is operbale to be connected to a load. The load is not shown in FIG. 5.

Also connected to the node 64 is a series combination of an indicating device 32 and a resistance 30. The indicating device 32 is preferably a neon tube having a characteristic of conducting only when a minimum threshold of voltage is applied across it. The tube 32 indicates conduction within the control module, while the tube 62 also indicates a signal identical to the information supplied by the tube 32 but remote from the module. The series combination of the tube 32 and the resistor 30 are clamped to zero potential at the node 34. In parallel with the series combination of the tube 32 and the resistor 30 is a resistor 42, which is connected between the node 64 and the node 34.

It is desirable in the preferred embodiment of this invention to always have a conducting path between the cathode of the silicon control rectifier and the zero clamped node. If there is a load connected between the cathode at the node 64 and the zero clamped node 34, this conductive path is provided through the load. However, if such a load is not present, then this conductive path is provided by the resistor 42.

In FIG. 5, there are three variations of a basic circuit utilized, where each of the configurations are in parallel, and each performs an analogous but different logical function. What was described immediately above was the simplest gate function of one of these modules. This simple function is an on-off function. It is also referred to as a set point function.

Referring now to a more complicated logical function in one of the succeeding modules shown in FIG. 5 there is shown a capacitor 44 shorted, at one of its plates 45, to the cathode 64b of a silicon control rectifier 10b. It can be appreciated that the rest of the network pertinent to this succeeding module is similar to the network shown in the first module with the exception of this capacitor provided across the terminals 64b and 34b. The terminal 34b corresponds to terminal 34, being clamped at zero voltage.

Referring to yet another logical function of a successive module, there is shown a network similar to the first mentioned, or basic on-off module with the exceptions of modifications discussed immediately below.

A capacitor is connected at one plate to a zero clamped node 34c, and is connected at its other plate to a resistance 47. This resistance is connected to the cathode 64c of a silicon control rectifier 10c.

At the node 45c, at the junction between the capacitor 44c and the resistance 47, there is connected the anode of a diode 46. The cathode of the diode 46 is connected to the terminal 14, being at the anode of the silicon control rectifier 10c. The diode 46, similar to the other diodes is preferably a solid state rectifier. It is of the variety, also similar to the other diodes previously mentioned, that have a voltage drop of approximately one-half volt when conducting.

OPERATION OF THE LOGICAL GROUPING SYSTEM

Referring now to the first, or basic module, in the network shown in FIG. 5, it is desired to achieve a set point or on-off function. During the operation of the network shown, a fully rectified sinusoidal excitation is always applied at the node 16. The node 34 is always clamped at zero potential. If the signal applied at the node 22 is not nonzero and positive, then the silicon control rectifier 10 is not operable to conduct the excitation applied at the node 16 to its anode 64.

If no positive signal is observed at the node 22, then there is no signal applied to the full wave rectifying bridge 66, also referred to as a signal bridge, resulting in a positive signal applied to the gate 26 of the silicon control rectifier 10. Thus the silicon control rectifier 10 is in a nonconducting condition. This is true because there must be current in the gate to cathode path in order for the silicon control rectifier to avalanche into a conducting state.

If however, there is a sufficient positive signal at node 22 and the sinusoidal signal at node 16 is nonzero, then the silicon control rectifier 10 will avalanche into a conducting state. The silicon control rectifier 10 will continue to conduct whatever current is supplied at node 16 so long as a sufficient positive signal is received at the node 22.

When the silicon control rectifier 10 is conducting, a positive signal is experienced at the node 64. Because the drop across the diode 12 and the silicon control rectifier 10 is relatively small when the silicon control rectifier is conducting, there is sufficient potential supplied at the node 64 in the conduction state of the silicon control rectifier so that the neon tube 62 lights, indicating a conducting state, as does the neon tube 32.

Attention is now directed to the next succeeding module stage for discussion of its operation. In this module, rather than a simple on-off function, a pulsing function is achieved while the positive signal is applied at node 22 because of the action of the capacitor 22 between the zero clamp and the cathode of the silicon control rectifier 10b.

The silicon control rectifier is caused to initially conduct in the same manner as does the preceding module upon application of a positive voltage signal at the node 22. However after the silicon control rectifier starts conducting, excitation is applied to the capacitor 44 so that the capacitor begins to charge up. It reaches a full charge within a time less than one-half cycle of the sinusoidal excitation provided at the node 16.

After reaching its fully charged condition, the capacitor 44 discharges at the node 64b, increasing the potential at that node. Because of the increase in potential at the cathode of the silicon control rectifier 10b, it is deactuated from its conducting condition until the capacitor is sufficiently discharged so that the potential again drops. So long as the positive signal is continued at node 22, the silicon control rectifier 10b will again conduct and another cycle of operation similar to that immediately described above occurs.

Referring now to the operation of the next succeeding module, the function there achieved is that of a continuously conducting silicon control rectifier even after the positive voltage signal is removed from application at the node 22. A pulsing of the conduction state of the silicon control rectifier is achieved when the positive signal applied at the node 22 is above the critical threshold for initially turning on the silicon control rectifier, but less than a predetermined value of discharge of the capacitor 44c. Above a predetermined value, it discharges through diode 46 to the anode of the silicon control rectifier, maintaining the silicon control rectifier in a conducting state regardless of the positive or negative value of the signal applied at node 22. When the latter condition is reached, the silicon control rectifier 10c remains in a conductive state even if no signal is applied at node 22.

The silicon control rectifier 10c is turned on initially by application of a positive signal at node 22, in the manner similar to the basic module described earlier. After the silicon control rectifier 10c is turned on, the capacitor 44c then begins to charge through the resistance 47. The value of the resistance 47 is chosen so that the time constant of the RC branch of this circuit is such that, at this stage of the operation, the potential at the cathode 64c of the silicon control rectifier 10c is less than the potential at the node 14. Consequently, no current flows through the diode 46.

As the peak of the sinusoidal wave is reached, the voltage at the node 64c and consequently at the node 45c is greater than the voltage at the node 14. This may occur at some point between 90° and 180° of the sinusoidal excitation. The exact point is determined by the rate of charging and consequently charged condition of the capacitor 44c. When charged, current then passes from the node 45c to the anode of the silicon control rectifier at the node 14 through discharge of the capacitor through diode 46. At this point of operation, the gate is no longer firing. A portion of the discharge of capacitor 44c also passes through resistance 47 to the node 64c. Once the SCR is initially conducting, the capacitor 44c starts to charge through current supplied through the resistance 47. If the signal supplied at the node 22 is below a preselected threshold value, which is in part determined by the value of resistance 47, then the discharge of the capacitor 44c occurs (after 90° but before 180° of a phase of the sinusoidal excitation applied at node 16). The capacitor will drain through the resistance 47 and not have sufficient voltage through diode 46 to lock on. This results because the charged value of the capacitor 44c is sufficient to raise the anode voltage 64c to a high enough value to stop conduction of the silicon control rectifier. If the conduction of the silicon control rectifier 10c is stopped, there is no current path through the diode 46.

If the voltage supplied at the node 22 is above the aforementioned preselected threshold value, then the voltage charged on capacitor 44c reaches a higher value sooner. More specifically, it reaches this higher value closer to the 90° point than previously, and is sufficient to discharge through the diode 46 before the silicon control rectifier turns off, and maintain anode current above the minimum required to lock on so it cannot turn off. It maintains the conduction state because the current path through diode 46, once there is a higher voltage at the node 45c than at the node 14, provides less resistance for the discharge of the capacitor than through the resistance 47. In effect, resistance 47 is shorted at this stage of the operation.

The result of these circuit characteristics is that in the final module stage shown in FIG. 5, at first a pulsing function is achieved upon impressment of a positive voltage signal at the node 22. After that positive signal reaches a threshold value, where the SCR conduction time is sufficient to charge 44c through 47 in excess of lock requirement. The silicon control rectifier is maintained on even if the positive voltage signal is subsequently entirely removed from the node 22.

When this stage of the operation is reached, the capacitor 44c is charged up before it is discharged entirely. The result is that there always is some residual charge in capacitor 44c in contrast to the operation of the circuit prior to this condition. It can be appreciated that the resistor 47 not only is a factor in determining the time constant for charging and discharging of the capacitor 44c, but also provides an alternate and ultimately shorted out path of the discharge of the capacitor. In the preferred practice of this invention, the value of the resistance 47 is chosen to correspond with that of the resistance of the load in order that an optimal charging rate can be achieved that corresponds to the signal applied at the node 22. Calibration, recording, and a voltmeter apparatus are provided across the node 22 for supplying the transduced signal controlling the aforementioned modules and measuring the value of this signal. In the preferred practice of this invention, the meter is calibrated to read the percentage of the rated load.

Figure 6:
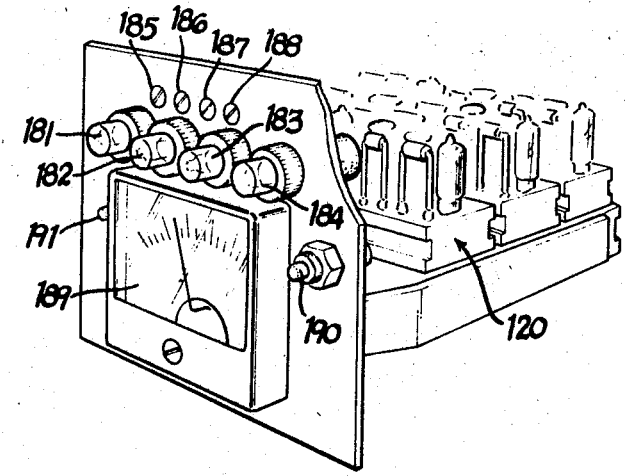
FIG. 6 is a perspective view of a module used in the preferred embodiment of the present invention.
Figure 13:
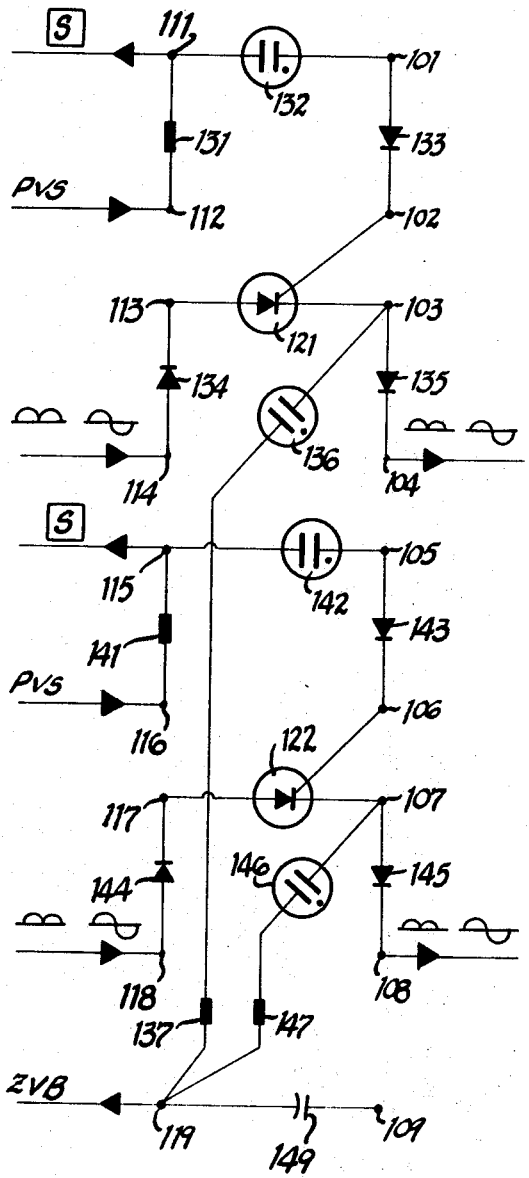
FIG. 13 is a schematic and symbolic diagram of the network characteristics of a basic module used in the preferred embodiment of this invention.

Referring to FIGS. 6 and 13 there is shown a module insertable into the preferred embodiment of the present invention. It carries the basic circuitry from which modifications may be made by adding components contactable with the terminal prongs on the module to provide desired logical functions. In the preferred module, as many as 18 terminal points are provided by the downwardly extending terminal prongs. Each of these downwardly extending terminal prongs is in direct electrical contact with one of the superstructure terminal points designated 101 to 109 and 111 to 119.

The preferred module 120 comprises two silicon control rectifier circuits. Each has a corresponding silicon control rectifier 121, 122. The silicon control rectifier 121 has its anode connected to the terminal 113, its gate connected to terminal 102, and its cathode connected to terminal 103. The silicon control rectifier 122 has its anode connected to the terminal 117, its gate connected to the terminal 106, and its cathode connected to terminal 107.

Referring to the circuit associated with silicon control rectifier 121, a resistor 131 is connected between terminals 111 and 112. In series with resistor 131 is a neon tube 132 connected between the terminals 111 and 101. In series with the neon tube 132 is a diode 133, its anode connected to the terminal 101 and its cathode connected to the terminal 102. The series combination of the resistor 131, the neon tube 132, and the diode 133 provide the conduit for a positive current to be applied to the gate of the silicon control rectifier 121.

A diode 134 is connected at its cathode to the terminal 113 and at its anode to the terminal 114, providing a conductive path to the anode of a silicon control rectifier 121. A diode 135 is connected at its anode to the terminal 103 and at its cathode to the terminal 104, providing a conductive path from the cathode of the silicon control rectifier 121. A neon tube 136 and a resistance 137 are connected between terminals 103 and 119. This circuit branch provides a path for the output from thhe cathode of silicon rectifier 121 to a potential clamped at zero.

Referring to the network closely associated with the silicon control rectifier 122, a resistance 141 is connected between terminals 115 and 116. In series with this resistor is a neon tube 142 connected between terminals 115 and 105. In series with the two immediately aforementioned components is a diode 143 connected at its anode to the terminal 105 and at the cathode to the terminal 106. The series combination of the resistance 141, the neon tube 142, and the diode 143 provide a conductive path for a positive current to be applied to the gate of the silicon control rectifier 122.

A diode 144 is connected at its cathode to the terminal 117 and at its anode to the terminal 118, providing a conductive path to the anode of the silicon control rectifier 122. A diode 145 is connected at its anode to the terminal 107 and at its cathode to the terminal 108, and provides a conductive path from the cathode of a silicon control rectifier 122. A neon tube 146 connected in series with a resistance 147 is applied across the terminals 107 and 119, and provides a conductive path to a potential clamped at zero for the output of the silicon control rectifier 122. A capacitor 149 is connected across terminals 109 and 119. This capacitor 149 may be used in conjunction with other components provided at the connections to lower terminal prongs for obtaining a pulsing, delaying, or blocking function of the network associated with silicon control rectifier 121 or silicon rectifier 122.

Figure 7:
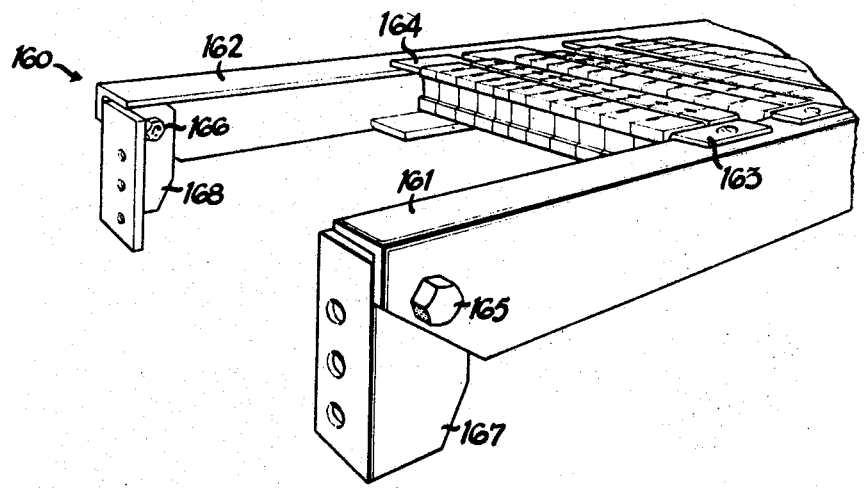
FIG. 7 is a perspective view of apparatus embodying a plurality of modules in the preferred embodiment of this invention.

Referring to FIG. 7, there is shown a module rack used in the preferred embodiment of the present invention. The rack comprises a pair of rails 161 and 162 between which a module mounting block, corresponding to module 120 shown in FIG. 6, are secured by screws provided through brackets 163 and 164 on each of the modules.

The rack 160 has each of its rails 161, 162 secured by bushings 165, 166, respectively, that have a bolt head on one end and a threadably mating nut on the other so as to provide a journal support on brackets 167, 168, respectively. Brackets 168, 169 may be secured to a control panel in such a way that the entire module rack may be swung to ready access for observance of firing of the neon tubes on the modules to determine at a glance which modules are functioning properly.

By using a mounting such as the module rack shown in FIG. 7 together with modules such as that shown in FIG. 6 that can be readily attached or detached from the rack module mounting blocks, the wide spread use of neon tubes throughout the circuitry utilized for logical function in the control of industrial processes facilitates debugging of the apparatus. This is a result of the easy access to and ready determination of a module that is not functioning properly. In this manner maintenance of a system is easily checked and any errors are readily corrected by rapid replacement of defective parts. In this manner control apparatus utilizing the present invention has a significantly reduced down time.

Figure 8:
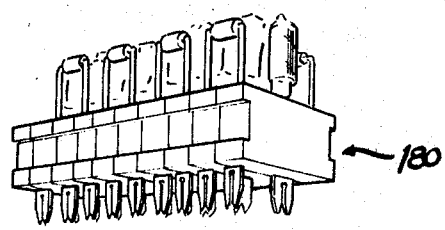
FIG. 8 is a front view of a control panel used in the preferred embodiment of this invention.
Figure 9:
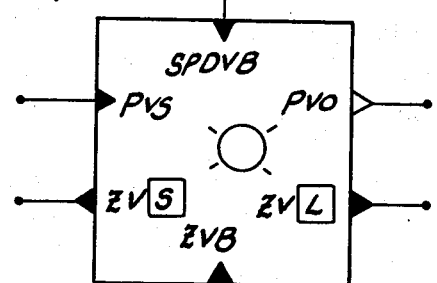
FIGS. 9, 10, 11 and 12 are symbolic diagrams corresponding to the logical functions of the networks shown in FIGS. 1, 2, 3 and 4, respectively.
Figure 10:
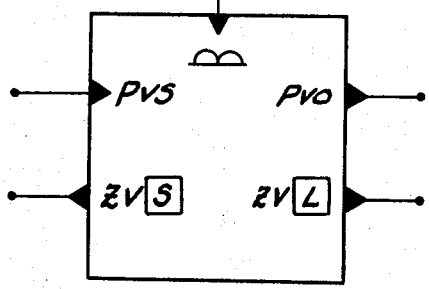
Figure 11:
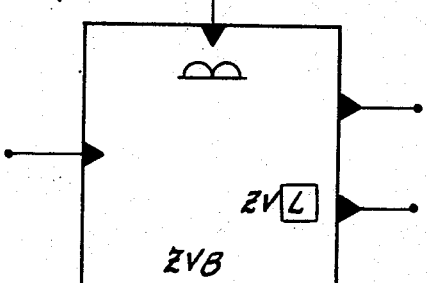
Figure 12:
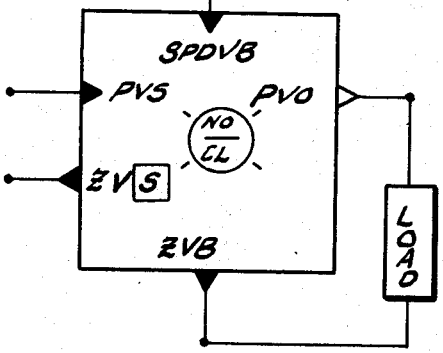

Referring to FIG. 8, there is shown a control panel for a logical grouping system monitor utilized in the preferred embodiment of this invention. The network for this panel is shown schematically in FIG. 5. A module such as module 120 provide the basic building blocks for the circuit utilized in conjunction with the panel 180 shown in FIG. 8.

Lights 181, 182, 183, 184 correspond to each of the module networks in the circuit shown in FIG. 5. Variable potentiometers providing voltage division referred to in the circuit shown in FIG. 5 are represented by screw settings 185, 186, 187, 188, respectively. The face of the meter calibrated in percent of load is shown at numeral 189. Buttons 190 and 191 actuate switches for resetting of corresponding module networks in the circuit shown in FIG. 5.

It can readily be appreciated that the lights 181, 182, 183, 184 correspond to various logical functions of the circuit by which they are powered. In this manner the panel shown in FIG. 8 gives direct visual indication by means of alarm signals by light as well as relative measure of load by meter.

It can also be appreciated that the neon tubes used in the modules to provide logical functions for controlling of the lights on the front of the control panel also give a visual indication in the back of the panel to indicate which of the modules are operating correctly. In this manner checking of the correct operation of the control monitor as well as efficient debugging and maintenance of the unit is achieved.

Referring to FIGS. 9, 10, 11, 12, there is show in each of these figures a symbolic representation of the network interconnections, wave shape excitations and outputs, signal characteristics and functions, and over all network functions of the networks represented by FIGS. 1, 2, 3, 4, respectively. It can be appreciated that the present invention provides networks in which the logical functions can be conveniently described by a set of symbols conveying all of the circuit connections, signal, and logic information immediately referred to above.

I claim:

1. A monitoring circuit comprising a source of a full wave rectified signal, a terminal at zero potential, a silicon controlled rectifier, a diode, a load, means connecting said source, said diode, said silicon controlled rectifier, said load and said zero terminal in a series circuit path with said diode connected between said source and the anode of said silicon controlled rectifier and said load connected between said terminal and the cathode of said silicon controlled rectifier, said diode and said silicon controlled rectifier being poled to conduct current flowing from said source to said zero terminal when said silicon controlled rectifier is fired, a second source supplying positive voltage, first and second resistors and a second diode, means connecting said first resistor and said second diode in series with each other between said second source and the gate of said silicon controlled rectifier with the cathode of said second diode connected to said gate and the anode of said second diode connected to said first resistor, means connecting said second resistor between the gate and the cathode of said silicon controlled rectifier, whereby said first and second resistors and said second diode provide a path for applying firing voltage to said silicon controlled rectifier from said second source and said second resistor serves to set the sensitivity of said silicon controlled rectifier to the firing voltage, a neon tube and a resistor connected in series with each other and in parallel with said load for indicating the condition of conduction of said silicon controlled rectifier, and means for applying a blocking signal at a potential above said zero terminal between said first resistor and said second diode to prevent conduction of said silicon controlled rectifier.

2. The circuit as claimed in claim 1 in which said means for applying a blocking signal includes a second neon tube connected between said first resistor and said second diode, and a terminal between said second neon tube and said first resistor at which said positive blocking signal is selectively applied.

3. The circuit as claimed in claim 2 including another terminal between said second neon tube and said second diode for receiving zero potential to selectively block conduction of said silicon controlled rectifier.

4. The circuit as claimed in claim 3 including a third resistor connected to the anode of said silicon controlled rectifier, a capacitor connected between said third resistor and said first-named zero terminal to be charged to a reference potential, and means conductively connecting said capacitor to the anode of said silicon controlled rectifier for sustaining conduction thereof after firing of the same even if the firing signal is blocked.

5. The circuit as claimed in claim 4 including a third diode connected between the cathode of said silicon controlled rectifier and said load, a Zener diode connected to the cathode of said silicon controlled rectifier, and a terminal connected between said load and said third diode at which blocking potential may be applied to prevent conduction of said silicon controlled rectifier.

References Cited

UNITED STATES PATENTS

| | | | |
|---|---|---|---|
| 2,558,637 | 6/1951 | Walz | 340—415 |
| 3,084,338 | 4/1963 | Mauer | 340—213.1 |
| 3,147,464 | 9/1964 | Spielman | 340—415 |
| 3,381,286 | 4/1968 | Walsh | 340—213.1 |

JOHN S. HEYMAN, Primary Examiner

D. M. CARTER, Assistant Examiner

U.S. Cl. X.R.

340—415